United States Patent
Schmidt

(10) Patent No.: US 9,261,105 B2
(45) Date of Patent: Feb. 16, 2016

(54) BEARING UNIT FOR A TURBOCHARGER

(75) Inventor: Heiko Schmidt, Muehlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 87 days.

(21) Appl. No.: 13/993,989

(22) PCT Filed: Nov. 14, 2011

(86) PCT No.: PCT/EP2011/070051
§ 371 (c)(1),
(2), (4) Date: Jun. 13, 2013

(87) PCT Pub. No.: WO2012/079883
PCT Pub. Date: Jun. 21, 2012

(65) Prior Publication Data
US 2013/0259416 A1 Oct. 3, 2013

(30) Foreign Application Priority Data
Dec. 17, 2010 (DE) .................. 10 2010 054 905

(51) Int. Cl.
| F16C 35/04 | (2006.01) |
| F04D 29/056 | (2006.01) |
| F16C 19/18 | (2006.01) |
| F16C 35/067 | (2006.01) |
| F16C 27/04 | (2006.01) |

(52) U.S. Cl.
CPC .......... F04D 29/0563 (2013.01); F16C 19/184 (2013.01); F16C 27/045 (2013.01); F16C 35/067 (2013.01); F16C 2360/24 (2013.01)

(58) Field of Classification Search
CPC ................................. F16C 2360/24
See application file for complete search history.

(56) References Cited

U.S. PATENT DOCUMENTS

| 4,721,441 A | 1/1988 | Miyashita et al. | |
| 4,789,253 A * | 12/1988 | Perego | F01D 25/164 384/517 |
| 4,943,170 A | 7/1990 | Aida | |
| 5,076,766 A | 12/1991 | Gutknecht | |
| 2005/0287018 A1 | 12/2005 | Mavrosakis | |
| 2007/0036477 A1 * | 2/2007 | McKeirnan, Jr. | F01D 25/16 384/517 |
| 2007/0110351 A1 | 5/2007 | Larue | |
| 2010/0003132 A1 | 1/2010 | Holzschuh | |
| 2011/0052388 A1 * | 3/2011 | Mavrosakis | F01D 25/162 415/229 |

FOREIGN PATENT DOCUMENTS

| CN | 101542088 A | 9/2009 |
| CN | 101568736 A | 10/2009 |
| CN | 101644185 A | 2/2010 |
| DE | 3801590 | 8/1988 |
| DE | 68908244 T2 | 11/1993 |
| DE | 3531313 C3 | 4/1995 |
| DE | 20005227 U1 | 8/2000 |
| DE | 202004017194 | 4/2006 |
| WO | WO 2006004654 | 1/2006 |

* cited by examiner

Primary Examiner — Thomas R. Hannon
(74) Attorney, Agent, or Firm — Davidson, Davidson & Kappel, LLC

(57) ABSTRACT

A bearing unit for a turbocharger, including a bearing housing which extends in an axial direction, a bearing cartridge, situated within the bearing housing, having an outer bearing ring, and a securing element, situated on the bearing housing, for the twist-free positioning of the outer bearing ring within the bearing housing. The sum of the forces acting on the outer bearing ring is essentially zero. A bearing unit of this type prevents twisting of the outer bearing ring without reducing the vibration-damping effect of the quenching oil film.

10 Claims, 5 Drawing Sheets

FIG. 1
FIG. 2
FIG. 3
FIG. 4
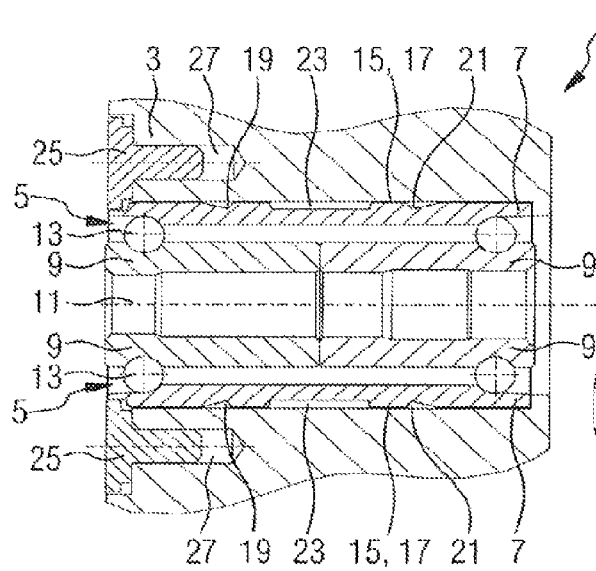
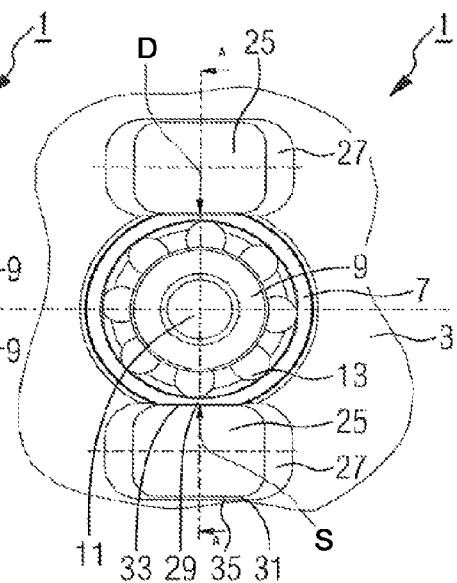
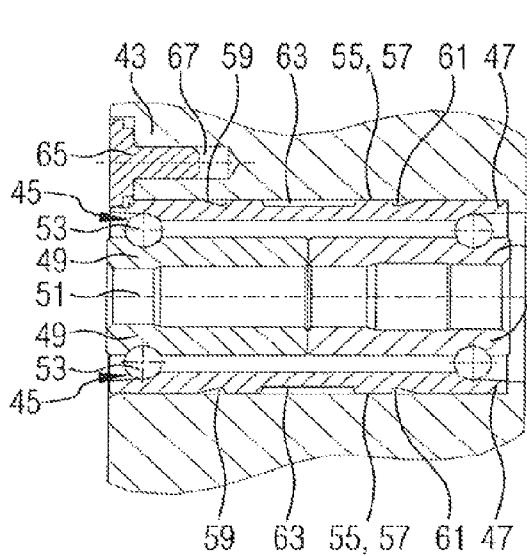
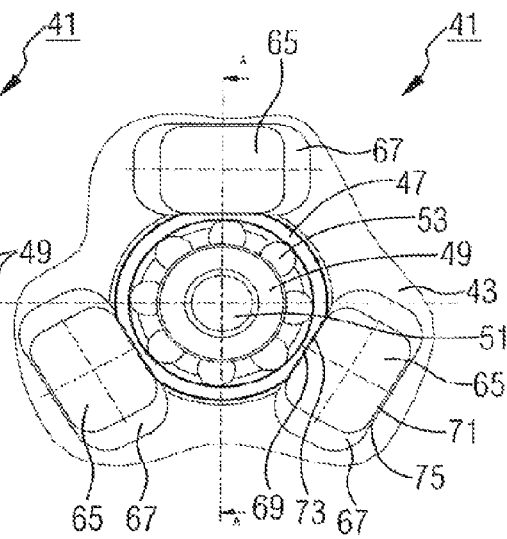

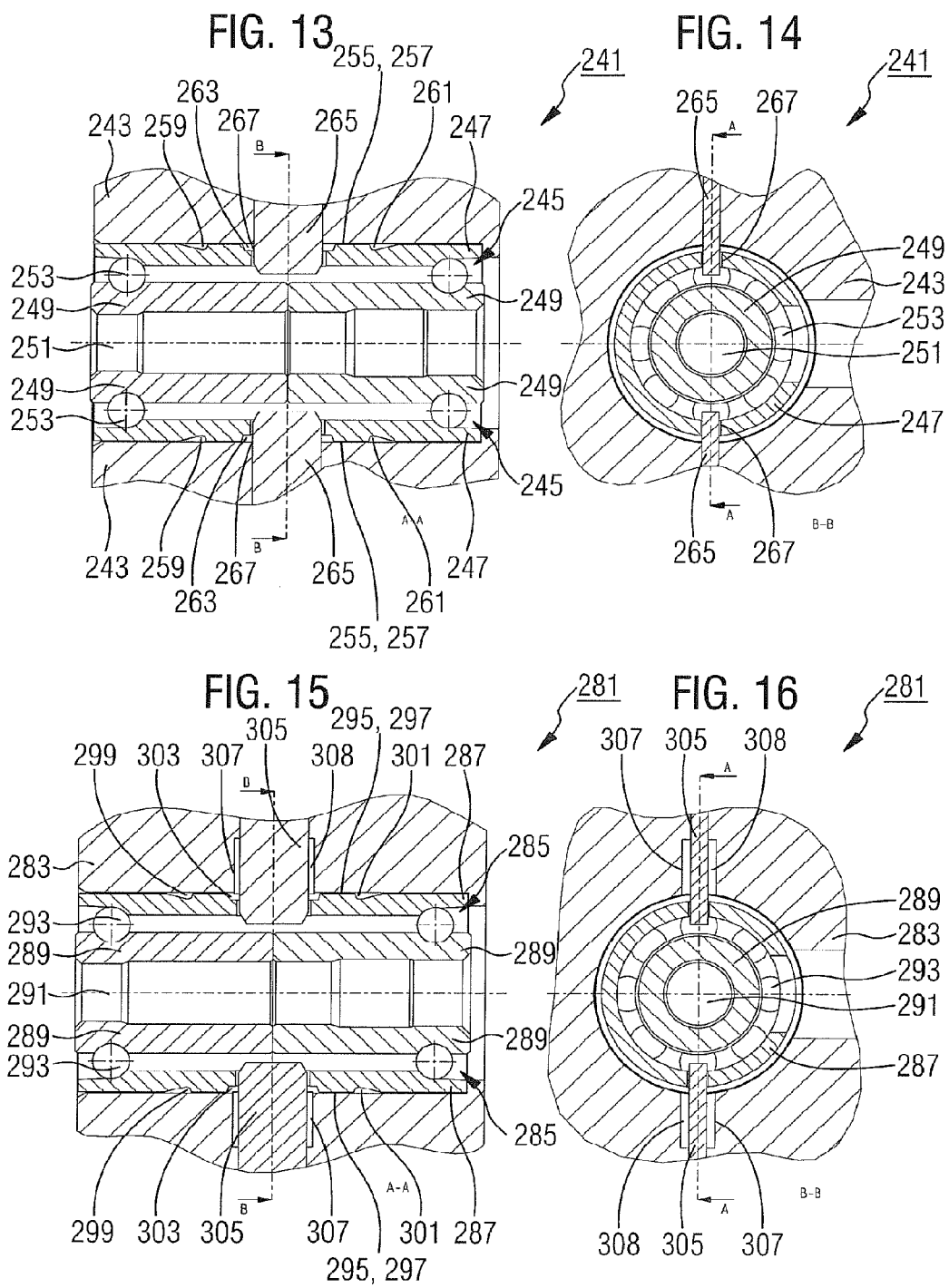

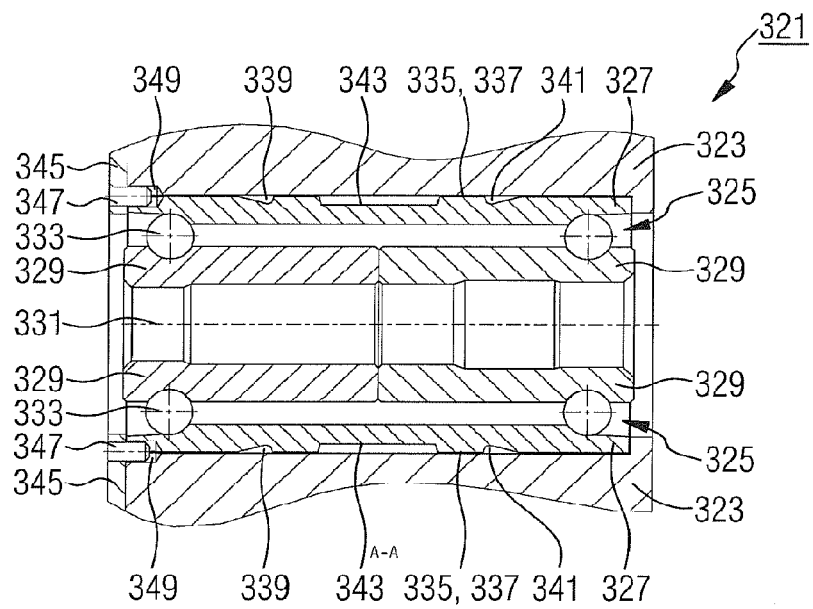

BEARING UNIT FOR A TURBOCHARGER

The present invention relates to a bearing unit for a turbocharger, including a bearing housing which extends in an axial direction, a bearing cartridge, situated within the bearing housing, having an outer bearing ring, and a securing element, situated on the bearing housing, for the twist-free positioning of the outer bearing ring within the bearing housing.

BACKGROUND

A turbocharger is usually used for increasing the power of internal combustion engines by utilizing exhaust gas energy. For this purpose, the turbocharger is composed of a compressor and a turbine which are connected to one another via a shaft mounted within a bearing housing.

During operation, the turbine is set into rotation by an exhaust gas flow, and via the shaft drives the compressor, which draws in and compresses air. The compressed air is led into the engine, a large quantity of air entering into the cylinders during the induction stroke due to the increased pressure. As a result, the oxygen content required for the combustion of fuel correspondingly increases, so that more oxygen enters into the combustion chamber of the engine with each intake stroke.

This results in an increase in the maximum torque, causing the power output, i.e., the maximum power at a constant working volume, to increase. This increase allows in particular the use of a more powerful engine having approximately the same dimensions, or alternatively, allows a reduction in the engine dimensions, i.e., achieving comparable power with smaller and lighter machines.

During operation of a turbocharger, the shaft rotates at a high rotational speed with increasing engine speed. Due to the high rotational speed, vibrations which are caused, for example, by rotation of the shaft may be transmitted to the individual components of the bearing unit. In principle, a so-called quenching oil film which is formed in the space between the outer bearing ring and the bearing housing is used to damp these vibrations and thus prevent contact between the bearing components to be able to ensure proper operation of a turbocharger.

A bearing device for a turbocharger of the type mentioned at the outset is known from DE 35 31 313 C3. The bearing unit includes a bearing, designed as a ball bearing, which is accommodated in a bushing. The bushing, in turn, is positioned in a bearing housing. Recesses which together form a hole are introduced into the outer peripheral surface of the bushing and into the inner peripheral surface of the bearing housing. For positioning the bushing within the bearing housing, a securing element designed as a pin is provided which is loosely inserted into the recesses, i.e., the hole. The rotation of the outer bearing ring may be prevented in this way.

SUMMARY OF THE INVENTION

However, a disadvantage of the above-mentioned design is that an undamped transmission of force is facilitated due to the use of the securing element at the provided position. This results in the risk of undesirable contact between the outer bearing ring and the bearing housing, so that proper operation of the turbocharger cannot be ensured.

It is an object of the present invention to provide an option for securely positioning the outer bearing ring within the bearing housing which is improved over the related art, and which prevents twisting of the outer bearing ring without reducing the vibration-damping effect of the quenching oil film.

The present invention provides a bearing unit for a turbocharger, including a bearing housing which extends in an axial direction, a bearing cartridge, situated within the bearing housing, having an outer bearing ring, and a securing element, situated on the bearing housing, for the twist-free positioning of the outer bearing ring within the bearing housing. It is provided that the sum of the forces acting on the outer bearing ring via the antitwist protection is essentially zero.

The present invention takes into account the fact that, although antitwist protection of the outer bearing ring in a bearing housing may be achieved by the securing elements used thus far, the outer bearing ring within the bearing housing is pressed in a preferred direction corresponding to the direction of force via the force introduced via the antitwist protection, thus reducing, and in the worst case completely eliminating, the quenching oil film provided in the space. During operation of the turbocharger this may result in undesirable contact of the outer bearing ring with the bearing housing, and thus, undamped transmission of force between these components. In addition to a high noise level, in particular also a fatigue-related shortened service life of the bearing unit is observed.

In other words, although the twisting of the outer bearing ring may be prevented by the securing elements used thus far, the required centering of the bearing cartridge within the bearing housing is disturbed due to the introduced forces.

Taking this into account, the present invention recognizes that the above-mentioned problem may be overcome when the sum of the forces acting on the outer bearing ring is essentially zero. The situation may thus be prevented in which the outer bearing ring is pressed in a preferred direction, and undesirable contact results between the bearing cartridge or the outer bearing ring and the bearing housing.

In this regard, various force components which influence the centering and the coaxial orientation of the bearing cartridge within the bearing housing must be taken into account, depending on the design of the bearing unit. In particular, the forces transmitted to the outer bearing ring via the securing element, as well as the forces produced by the oil pressure and the force of gravity, must be taken into account.

In principle, the securing element may have various shapes and sizes. The securing element may be designed as a journal, a bolt, or also as a spring element, for example, a section of the securing element, for example, being designed for engaging with a recess or a hole within the bearing housing. The securing element is preferably made of a heat-resistant metallic material. In addition, the securing element, for example, may either be fixedly connected to the bearing housing, or positioned in holes provided within the bearing housing. In particular a form-locked connection is formed between the securing element and the outer bearing ring.

The bearing cartridge usually includes at least one bearing having an inner bearing ring and an outer bearing ring, between which a number of rolling bodies are guided. The rolling bodies are guided in rolling body raceways introduced at the outer periphery of the inner bearing ring and at the inner periphery of the outer bearing ring. Both bearing rings may be made in either one piece or two pieces.

The bearing housing may be made of various materials. Due to the high stresses during operation of a turbocharger, in particular heat- and corrosion-resistant metallic materials are suited. The bearing housing is in particular provided with a location hole for the bearing, the inner diameter of the location hole being slightly larger than the outer diameter of the outer bearing ring. The resulting space for providing the oil film, which is designed, for example, as a gap between the outer bearing ring and the bearing housing, is correspondingly determined by the dimensions of the location hole and the outer bearing ring.

For supplying the space with oil, a number of supply holes may be provided in the bearing housing, which in the installed state are in communicating connection in each case with grooves surrounding the outer periphery of the bearing cartridge. In this way, oil may be pressed from the engine oil circuit into the space, and thus used for supplying the quenching oil film. A portion of the oil is then pressed, for example via a splash oil hole connected to the groove, from the grooves in the bearing cartridge into the bearing interior, and is available for lubricating the bearing components.

In addition, an outlet hole is preferably included in the bearing housing for drainage of the oil. This outlet hole may be in communicating connection with a drainage groove which is introduced at the outer periphery of the outer bearing ring, so that oil supplied to the space via the supply hole may continuously drain off.

The bearing itself may be designed as an anti-friction bearing, for example. A design having rolling bodies held within a cage, as well as a full ball variant without a cage, is conceivable. The bearing is usually formed with an inner bearing ring and an outer bearing ring. The bearing or the bearing unit may be positioned on a shaft via the inner bearing ring. With regard to the stresses on the bearing unit, and with regard to the operating conditions such as temperature influences or corrosion, the bearing rings are in particular made of heat- and corrosion-resistant materials such as through-hardened steels. A raceway for guiding rolling bodies is preferably provided in each case on the inner side of the bearing rings. In addition, one-piece as well as multi-piece manufacture of both bearing rings is possible. For a two-piece manufacture of the outer bearing ring, for example, a distance between the two partial rings with the aid of a pretensioned spring element is conceivable.

Alternatively, the bearing may be designed as a sliding bearing. In a sliding bearing, the two parts which move relative to one another have direct contact and slide over one another. The resulting frictional resistance may be overcome in particular by producing a lubricating film. In addition, the frictional resistance may be reduced by selecting low-friction material pairings of the contacting parts. Using a sliding bearing for bearing a shaft of a turbocharger is suitable, for example, since the oil supplied via the supply holes may also be used for lubricating the sliding bearing.

Furthermore, the bearing cartridge, for example in addition or as an alternative to the outer bearing ring, may have a support ring in which the bearing or the outer bearing ring is situated. A flexible design of the bearing cartridge corresponding to the particular requirement is thus made possible. For example, the bearing cartridge may be preinstalled according to the customers' specifications. For a bearing cartridge having an outer bearing ring, the oil film is provided between the outer bearing ring and the bearing housing. If the bearing cartridge additionally includes a support ring, the bearing or the further bearing components of the bearing cartridge in the installed state are positioned within the support ring. The space for the oil film is appropriately provided between the outer periphery of the support ring and the inner wall of the bearing housing. In that case, the grooves for supplying oil to the quenching oil film are advantageously provided either in the outer periphery of the outer bearing ring or of the support ring, and in the installed state of the bearing are in communicating connection with the supply holes in the bearing housing.

In one advantageous embodiment of the present invention, the overall force acting on the outer bearing ring essentially corresponds to the sum of the forces introduced by the securing element, the force of the oil pressure, and the weight of the bearing cartridge. In other words, the overall force is composed essentially of all forces acting during operation of the turbocharger.

Forces which affect the positioning of the bearing cartridge within the bearing housing, and thus the proper functioning of the turbocharger, are transmitted to the outer bearing ring via the securing element.

The number of securing elements is basically freely selectable. The number is in particular adapted to the size of the bearing arrangement, the positioning being flexible in particular with regard to the desired introduction of force. For a plurality of securing elements, the sum of the forces introduced by the securing elements and the forces acting on the outer bearing is essentially zero, so that the securing elements do not hinder the centering of the outer bearing ring within the bearing housing.

Due to the targeted positioning and dimensioning of the securing element used, these forces may be balanced, so that no contact results between the outer bearing ring and the bearing housing. For this purpose, the securing element may be positioned at various locations on the bearing unit. For example, the securing element may be situated on the end-face side of the bearing housing, in parallel to the center axis of the bearing housing.

The force acting on the bearing cartridge due to the oil pressure is in particular a function of the position and the orientation of the supply hole required for the action by the oil film. In principle, the oil pressure decreases from the point of action in the direction of the oil drainage. For example, in the case of an oil supply from above in the installed state, the oil pressure acting on the bearing cartridge decreases in the downward direction. The resultant force on the bearing cartridge correspondingly acts downwardly, so that in the worst case the required distance between the bearing cartridge and the bearing housing is zero.

In addition to the forces introduced by the antitwist protection and the force produced by the oil pressure, the weight of the bearing cartridge must also be taken into account as part of the overall force acting on the outer bearing ring. Due to its own weight, the bearing cartridge is pressed downwardly within the bearing housing, and must likewise be taken into account in the positioning and dimensioning of the securing element.

The number of securing elements used must also basically be taken into account. For a plurality of securing elements, the sum of the forces introduced by the securing elements and acting on the outer bearing ring may practically be zero, so that the securing elements do not hinder the centering of the outer bearing ring within the bearing housing. Alternatively, for example when the sum of the forces is not equal to zero, this difference may be balanced by the force of the oil pressure and/or by the force of the weight of the bearing cartridge itself, so that the resultant overall force acting on the outer bearing ring is essentially zero.

The number of securing elements is basically freely selectable. The number is adapted in particular to the size of the bearing arrangement, the positioning being flexible, in particular with regard to the desired introduction of force.

Thus, as a whole the overall force may be determined by coordinating the individual force components with one another even prior to assembly of the bearing cartridge, so that reliable centering of the bearing cartridge may be achieved during operation of the turbocharger.

In another advantageous embodiment of the present invention, the securing element is freely rotatable about its axis. During rotation of the outer bearing ring, it abuts the securing element during operation of the turbocharger. Due to the free rotatability of the securing element, it also correspondingly rotates until it comes into contact with the bearing housing. This then results in the form lock, desired for the fastening, which prevents further twisting of the outer bearing ring. The securing element is also preferably fixed in the radial direction, so that it cannot be pressed in the radial direction when the outer bearing ring twists. During rotation of the outer bearing ring within the bearing housing, the bearing ring and the securing element strike and mutually hinder one another. The resulting form lock prevents rotation of the outer bearing ring within the bearing housing.

In another advantageous embodiment of the present invention, a plurality of securing elements is included, the securing elements being situated essentially equidistantly along the periphery of the bearing housing. When multiple securing elements are used which are situated essentially equidistantly along the periphery of the bearing housing, the introduction of force occurs at multiple locations simultaneously. Thus, the sum of the forces acting on the outer bearing ring due to the securing elements is ideally practically zero, so that contact of the outer bearing ring with the bearing housing may be prevented. The self-centering of the outer bearing ring or of the bearing cartridge within the bearing housing is assisted in this way.

As mentioned above, the number of securing elements may be freely selected. When two securing elements are used which are situated equidistantly along the periphery of the bearing housing, this means, for example, that the securing elements are oppositely situated on the periphery at an angle of 180° with respect to one another. The securing elements, so to speak, are situated rotationally symmetrically with respect to the center axis of the bearing housing. When multiple securing elements are used, the distance between the securing elements becomes smaller. For three and also four securing elements, the angular distance between the securing elements decreases, for example, to 120° and 90°, respectively, along the periphery.

In other words, twisting of the outer bearing ring within the bearing housing may be prevented by the equidistantly situated securing elements, regardless of their number or size, without reducing the vibration-damping effect of the quenching oil film.

The, or each, securing element is preferably situated on the end-face side of the bearing housing. This design allows easy manufacture as well as simplified assembly of the bearing unit. The, or each, securing element may be fastened to the end-face side of the bearing housing after the bearing unit is installed, i.e., after the bearing cartridge is positioned within the bearing housing. This also allows easy installation directly by the customer.

Holes are advantageously included for fastening the, or each, securing element. The holes may be introduced into the bearing housing, or additionally or alternatively may be introduced into the outer bearing ring as part of the bearing cartridge. The holes may have circular or rectangular cross sections, for example, or may also be designed as a so-called elongated hole. The securing elements are fastened to the bearing unit in this way. For example, the securing elements may be pushed into the holes and held loosely therein. The diameter of the holes may correspondingly be slightly larger than the diameter of the securing elements. Pressing the securing elements into the holes is also possible. In this case, the diameter of the holes corresponds approximately to the diameter of the securing elements, or is slightly smaller. Both options provide sufficient antitwist protection of the outer bearing ring.

The holes are advantageously provided on the end-face side of the bearing housing. The holes may, for example, extend in the axial direction, in parallel to the bearing housing axis. This design allows an option of easily fastening the securing elements to the bearing housing, since the end-face side of the bearing housing represents an area of the bearing unit having particularly good accessibility. The section of the securing elements introduced into the holes then extends in parallel to the bearing housing axis.

Alternatively, the holes may be provided transversely with respect to the bearing housing axis. In principle, of course, it is also possible to introduce the holes into the shell of the outer bearing ring and/or of the support ring in such a way that the, or each, securing element, or in each case the section of the securing element accommodated in the hole, extends radially away from the bearing housing in the direction of the shaft.

The, or each, securing element in each case is particularly preferably designed as a securing pin having a flattened area for contact with a counter-flattened area of the bearing cartridge. The, or each, securing pin may be easily inserted into holes provided for this purpose within the bearing housing. The securing pins may, for example, have a circular cross section or also a rectangular cross section. The securing pins may either be solid or, for example for a circular cross section, may be designed in the form of a tube having an appropriate wall. The holes provided for accommodation in the bearing housing then correspondingly have the shape of the securing pins.

In the installed state, the flattened area of the securing pin abuts a counter-flattened area of the bearing cartridge or of the outer bearing ring. In addition, the securing pin preferably includes a further flattened area for contact with the bearing housing. The bearing housing itself is preferably also provided with a corresponding counter-flattened area. The mutual contact of the respective flattened areas against one another results in a retention force due to the form lock in the contact edge area between the flattened areas of a securing pin and the counter-flattened areas of the bearing unit.

In another advantageous embodiment of the present invention, the, or each, securing element is designed in each case as a bolt which is fixedly situated in the shell of the bearing housing. Antitwist protection of the outer bearing ring within the bearing housing may likewise be achieved in this way. The bolts extend, for example, in holes which are introduced into the shell of the outer bearing ring with a radially inward orientation in the direction of the shaft. Alternatively, the bolts may extend in parallel to the housing axis. The number of bolts may likewise be selected corresponding to the dimensions of the bearing unit. When multiple bolts are used, as mentioned above, due to an equidistant arrangement along the periphery of the bearing unit the forces introduced via the form lock mutually balance.

A securing plate is advantageously situated on the end-face side of the bearing housing. The securing plate is likewise used for the twist-free positioning of the outer bearing ring within the bearing housing. The securing plate may, for example, be fixedly situated on the bearing housing. The securing plate is preferably provided with flattened areas on its side facing the bearing housing which come into contact with corresponding counter-flattened areas of the outer bearing ring. Oppositely directed forces of the same magnitude which cancel each other out in sum act on the outer bearing ring via the flattened areas, so that twist-free positioning of the outer bearing ring may be ensured. Of course, further securing elements in addition to the securing plate may be used if needed.

It is further preferred that a securing element is situated on the securing plate. In this regard, the number of securing elements is variable. In any case, also when a securing plate having securing elements is used, the securing elements are equidistantly situated on the securing plate. Here as well, the introduction of force occurs in such a way that the forces introduced via the antitwist protection cancel each other out in sum. The securing plate may be manufactured in one piece with the securing elements. Alternatively, the securing elements may be manufactured as separate parts and fastened to the securing plate.

The geometry and the size of the securing elements are adapted in particular to the size of the securing plate and to the dimensions of the bearing unit. In principle, the securing elements situated on a securing plate may also be designed as journals, pins, or spring elements. Grooves are advantageously provided on the end-face side of the bearing unit for the engagement of the securing elements. The grooves may extend into the bearing housing in the axial direction, for example, for different distances, and allow the rotation of the outer bearing ring in the bearing housing to be prevented, in particular when a securing plate fixed to the housing is used.

In principle, in addition to the above-mentioned specific embodiments of the securing elements, a plurality of securing elements is also conceivable, the securing elements being sufficiently stable to withstand the forces acting during operation of a turbocharger, and allowing the outer bearing ring to be situated within the bearing housing in a twist-free manner.

BRIEF DESCRIPTION OF THE DRAWINGS

Exemplary embodiments of the present invention are explained in greater detail below with reference to the drawings.

FIG. 1 shows a bearing unit for a turbocharger having securing elements, in a longitudinal section;

FIG. 2 shows the bearing unit according to FIG. 1 in a top view;

FIG. 3 shows another bearing unit for a turbocharger having securing elements, in a longitudinal section;

FIG. 4 shows the bearing unit according to FIG. 3 in a top view;

FIG. 13 shows another bearing unit for a turbocharger having securing elements, in a longitudinal section;

FIG. 14 shows the bearing unit according to FIG. 13 in a top view;

FIG. 15 shows another bearing unit for a turbocharger having securing elements, in a longitudinal section;

FIG. 16 shows the bearing unit according to FIG. 15 in a top view;

FIG. 17 shows another bearing unit for a turbocharger having securing elements, in a longitudinal section;

FIG. 18 shows another bearing unit for a turbocharger having securing elements, in a longitudinal section; and FIG. 19 shows the bearing unit according to FIG. 17 in a top view.

DETAILED DESCRIPTION OF THE DRAWINGS

Figure 5:
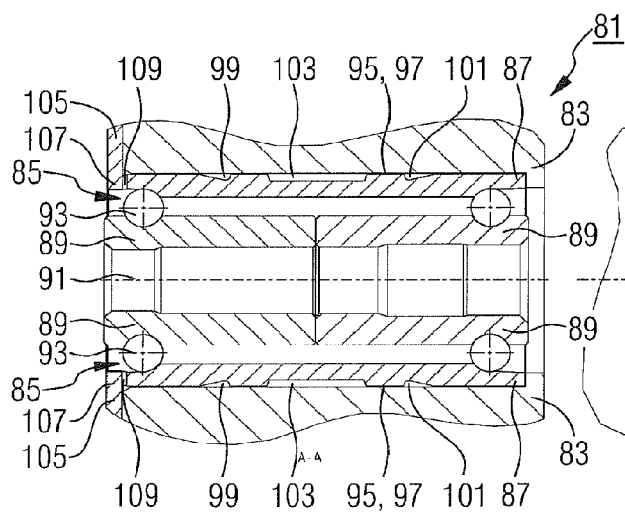
FIG. 5 shows another bearing unit for a turbocharger having a securing plate and securing elements, in a longitudinal section.

The following exemplary embodiments each show possible designs of a bearing unit in which securing elements are inserted for the twist-free positioning of an outer bearing ring within a bearing housing.

FIG. 1 shows a bearing unit 1 for a turbocharger in a longitudinal section. Bearing unit 1 has an axially extending metallic bearing housing 3 in which a bearing 5 designed as a double-row angular-contact ball bearing is positioned. Bearing 5 is provided with an outer bearing ring 7 and an inner bearing ring 9. Inner bearing ring 9 has a two-piece design and is situated on a shaft 11. Spheres are inserted between bearing rings 7, 9 as rolling bodies 13.

A space 15 in the form of a gap having an oil film 17 is formed between the outer periphery of outer bearing ring 7 and bearing housing 3. In the installed state, oil film 17 is supplied with oil via supply holes, not shown. The supply holes in each case are in communicating connection with grooves 19, 21 surrounding the outer bearing ring on its outer periphery. In the present case, the oil present within space 15 acts as a quenching oil film, and thus has a vibration-damping effect.

In addition, outer bearing ring 7 is provided with a drainage groove 23 on its outer periphery via which the oil of oil film 17 may drain off. In the installed state of bearing 5, drainage groove 23 is in communicating connection with an outlet hole, so that the continuously supplied oil may drain off and a uniform oil film 17 may be ensured.

Two securing elements 25 are situated on the end-face side of bearing housing 3 for fastening bearing 5 or for the twist-free positioning of outer bearing ring 7. Securing elements 25 are designed as securing pins and are fastened in holes 27 on the end-face side of the bearing housing. Securing elements 25 are oppositely situated at an angular distance of 180° with respect to one another. The securing elements are fixed in the radial direction and are freely rotatable about their axis. Each securing element 25 is provided with two flattened areas 29, 31. In the installed state, first flattened area 29 abuts counter-flattened area 33 of outer bearing ring 7. Second flattened area 31 comes into contact with counter-flattened area 35 of bearing housing 3. As a result of this combination, outer bearing ring 7 is hindered from twisting within bearing housing 3.

Securing pins 25 allow sufficient room for outer bearing ring 7 in the radial direction, so that the outer bearing ring may utilize the entire quenching oil film gap with respect to the housing. The forces D and S transmitted from securing pins 25 to outer bearing ring 7 are equal in magnitude and act in opposite directions, thus ensuring balancing of the acting forces.

Overall, due to the introduction of force at two opposite locations, undesirable twisting of outer bearing ring 7 within bearing housing 3 is prevented without adversely affecting the centering in the quenching oil film.

In the present case, the axial securing is achieved by the contact of the end faces of outer bearing ring 7 with counter-faces fixed to the housing in each case (not visible due to the illustration).

FIG. 2 shows bearing unit 1 according to FIG. 1 in a top view. The positioning of securing pins 25 along the periphery of the bearing housing is clearly apparent. The angular distance between securing pins 25 is 180°, so that they are situated rotationally symmetrically with respect to the center axis of bearing housing 3.

This arrangement allows an introduction of force at both locations, the sum of the introduced forces being zero. As a result, outer bearing ring 7 is not pressed in a preferred direction, but rather, is situated within bearing housing 3 in a twist-free manner. Correspondingly, quenching oil film 17 in space 15 has practically the same thickness at every location, so that bearing 5 is securely positioned within bearing housing 3.

FIG. 3 shows a bearing unit 41 for a turbocharger in a longitudinal section. The same as in FIG. 1, bearing unit 41 has an axially extending metallic bearing housing 43 and a bearing 45, designed as a double-row angular-contact ball bearing, positioned in the bearing housing. Bearing 45 has an outer bearing ring 47, and a two-piece inner bearing ring 49 which is situated on a shaft 51. Spheres are used as rolling bodies 53. Quenching oil film 57 provided in space 55 between bearing housing 43 and outer bearing ring 47 acts as a vibration damper.

For the further description of the individual bearing components of bearing unit 41, at this point reference is made to the detailed description for FIGS. 1 and 2, which may be analogously transferred.

In the present case, three securing elements 65 for fastening bearing 45 or for the twist-free positioning of outer bearing ring 47 are situated on the end-face side of bearing housing 43. In contrast to FIG. 1, however, in FIG. 3 three securing elements 65 are situated on the end-face side of the bearing housing.

Securing elements 65 here are equidistantly distributed over the periphery of the bearing housing at an angle of 120° with respect to one another. Accordingly, the resultant force acting on the outer bearing ring is practically zero in sum. Securing elements 65 according to FIG. 3 are also provided in each case with flattened areas 69, 71 which each abut counter-flattened areas 73, 75, respectively, and thus allow antitwist protection.

FIG. 4 shows the bearing unit according to FIG. 3 in a top view. The equal angular distance of 120° along the periphery of bearing housing 43 is clearly apparent. This design now allows an introduction of force at three locations, here as well the sum of the introduced forces being zero.

FIG. 5 shows another bearing unit 81 for a turbocharger in a longitudinal section, having an axially extending metallic bearing housing 83 and a bearing 85 designed as a double-row angular-contact ball bearing. Spheres are likewise inserted between outer bearing ring 87 and inner bearing ring 89 as rolling bodies 93. The description of the individual components of bearing unit 81 may be analogously taken from the detailed description for FIGS. 1 through 4.

In contrast to the preceding figures, a securing plate 105 is situated on the end-face side of bearing housing 83. Securing plate 105 is made of a metallic material, and is fixedly mounted on bearing housing 83. Securing plate 105 is likewise used for the twist-free positioning of outer bearing ring 87 within bearing housing 83.

Securing plate 105 has two securing elements 107, designed as spring elements, which are mounted opposite one another, each engaging with grooves 109 introduced at the end-face side of outer bearing ring 87. Spring elements 107 impress supporting forces on outer bearing ring 87 in opposite directions via grooves 109, the supporting forces canceling each other out in sum, thus ensuring the function of quenching oil film 97 as a vibration damper.

Figure 6:
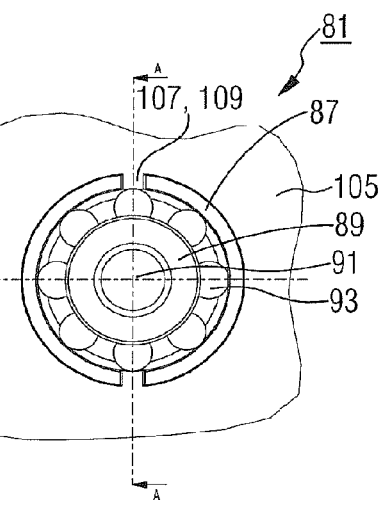
FIG. 6 shows the bearing unit according to FIG. 5 in a top view.

FIG. 6 shows the bearing unit according to FIG. 5 in a top view. It is apparent here that spring elements 107 are situated opposite one another on securing plate 105. The spring elements have an angular distance of 180° along the periphery of bearing housing 83.

Figure 7:
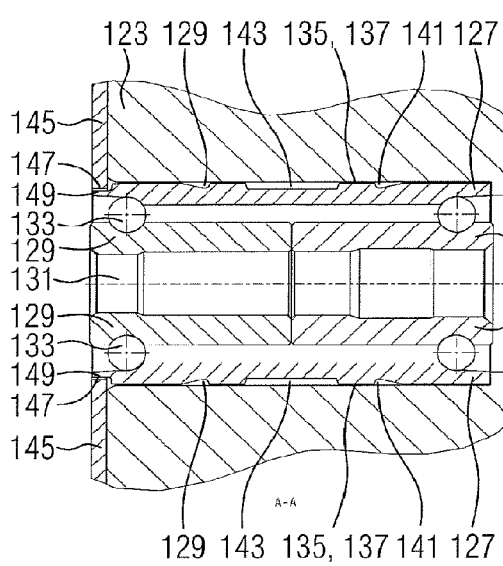
FIG. 7 shows another bearing unit for a turbocharger having a securing plate and securing elements, in a longitudinal section.

FIG. 7 shows another bearing unit 121 for a turbocharger in a longitudinal section. Bearing unit 121 has an axially extending metallic bearing housing 123 in which a bearing 125 designed as a double-row angular-contact ball bearing is positioned. Bearing 125 has an outer bearing ring 127 and a two-piece inner bearing ring 129. Inner bearing ring 129 is situated on a shaft 131. Spheres are inserted between bearing rings 127, 129 as rolling bodies 133. Quenching oil film 137 provided in space 135 between bearing housing 123 and outer bearing ring 127 has a vibration-damping effect.

For the further description of the individual bearing components of bearing unit 121, at this point reference is made to the detailed description for the preceding figures.

In the present case, a housing-mounted securing plate 145 is situated on the end-face side of bearing housing 123 for the twist-free positioning of outer bearing ring 127 in bearing housing 123. In the present case, housing-mounted securing plate 145 has two oppositely situated flattened areas 147. Outer bearing ring 127 correspondingly has a counter-flattened area 149. Due to the contact of flattened areas 147 of securing plate 145 with counter-flattened area 149 of outer bearing ring 127, the outer bearing ring is secured against undesirable twisting.

In the present case, flattened areas 147, 149 are designed in such a way that outer bearing ring 127 is able to move freely in space 135 with respect to bearing housing 123, thus ensuring the function of the quenching oil damper.

Figure 8:
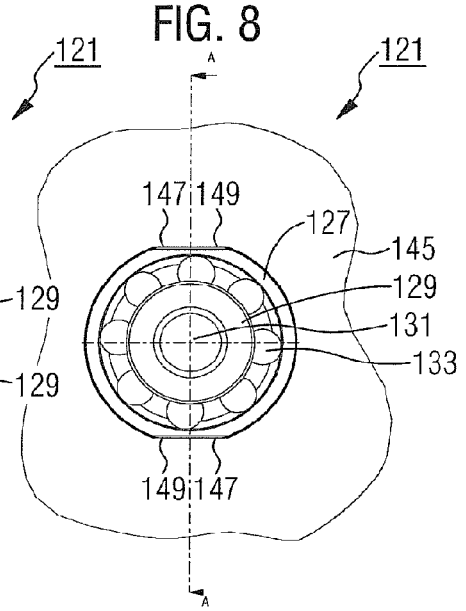
FIG. 8 shows the bearing unit according to FIG. 7 in a top view.

FIG. 8 shows bearing unit 121 according to FIG. 7 in a top view. The contact of flattened areas 147, 149 is easily visible here. The arrangement allows an introduction of force at the two oppositely situated locations at which flattened areas 147 of outer bearing ring 127 abut against flattened areas 147 of bearing housing 123. The sum of the introduced forces is zero, so that twist-free positioning of outer bearing ring 127 or of bearing 125 within bearing housing 123 is made possible in this way. Quenching oil film 137 in space 135 correspondingly has practically the same thickness at each location, so that bearing 125 is securely positioned within bearing housing 123.

Figure 9:
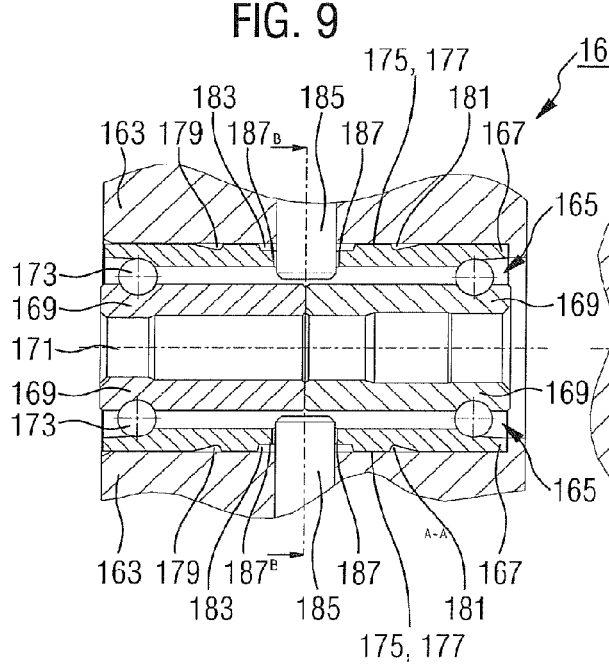
FIG. 9 shows another bearing unit for a turbocharger having securing elements, in a longitudinal section.

FIG. 9 shows another bearing unit 161 for a turbocharger in a longitudinal section, having an axially extending metallic bearing housing 163, and a bearing 165, designed as a double-row angular-contact ball bearing, positioned in the bearing housing. Bearing 165 has an outer bearing ring 167 and a two-piece inner bearing ring 169 which is situated on a shaft 171. Spheres are inserted as rolling bodies 173. Quenching oil film 177 provided in space 175 between bearing housing 163 and outer bearing ring 167 is able to absorb vibrations from shaft 171 which act on the bearing components during operation.

For the further description of the individual components of bearing unit 161, at this point reference is made to the detailed description for FIGS. 1 through 8.

Bearing housing 163 has two securing elements 185 designed as housing-mounted bolts. Securing elements 185 are situated opposite one another in the shell of bearing housing 163, and are oriented vertically with respect to the bearing housing axis. The securing elements extend from bearing housing 163, starting radially inwardly in the direction of shaft 171. To ensure twist-free positioning of outer bearing ring 167 within bearing housing 163, outer bearing ring 167 has two circular holes 187, likewise opposite one another, in which securing elements 185 are accommodated.

Outer bearing ring 167 is hindered from twisting due to the engagement of bolts 185 with holes 187 in the installed state. In addition, bolts 185 and holes 187 are designed in such a way that outer bearing ring 167 is able to move freely in the space with respect to bearing housing 163, thus ensuring the function of quenching oil film 177 as a vibration damper.

Holes 187 are circular, as the result of which securing elements 185 accommodated therein are also able to take over the axial securing of outer bearing ring 167 in addition to the antitwist protection.

Figure 10:
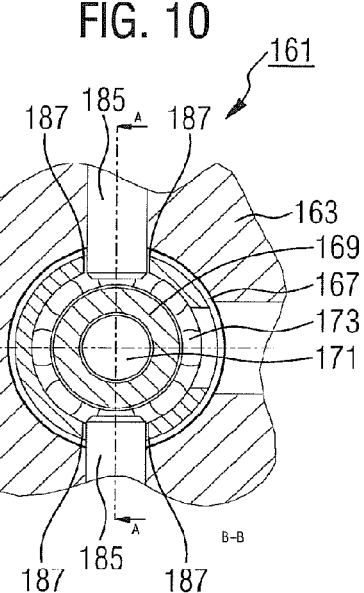
FIG. 10 shows the bearing unit according to FIG. 9 in a top view.

FIG. 10 shows bearing unit 161 according to FIG. 9 in a top view. Oppositely situated bolts 185, which are fixedly connected to bearing housing 123, are apparent. The introduction of force occurs simultaneously at two locations due to the positioning of bolts 185, so that the sum of the introduced forces is zero. Twisting of outer bearing ring 127 within bearing housing 123 may thus be prevented without reducing the vibration-damping effect of the quenching oil film.

Figure 11:
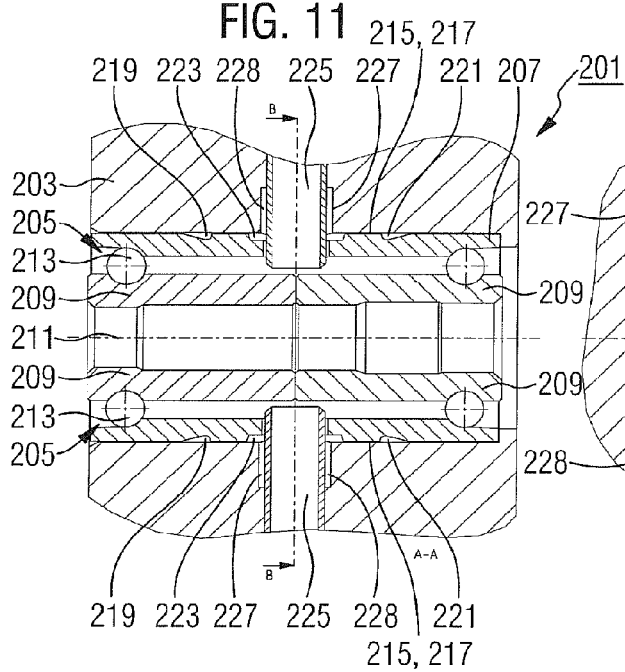
FIG. 11 shows another bearing unit for a turbocharger having securing elements, in a longitudinal section.

FIG. 11 shows another bearing unit 201 for a turbocharger in a longitudinal section. Bearing unit 201 has an axially extending metallic bearing housing 203 and a bearing 205, designed as a double-row angular-contact ball bearing, positioned in the bearing housing. Bearing 205 has an outer bearing ring 207, and a two-piece inner bearing ring 209 between which rolling bodies 213 designed as spheres are inserted. A quenching oil film 217 is provided in space 215 between bearing housing 203 and outer bearing ring 207.

The design according to FIG. 11 basically corresponds to that according to FIGS. 9 and 10, so that the further description of the bearing components may be analogously transferred.

The difference from the preceding figures lies in the design of securing elements 225. In the present case, securing elements 225 are designed as tubes having a circular cross section which are fixedly mounted in bearing housing 203. Securing elements 225 are likewise situated opposite one another in the shell of bearing housing 203, and are oriented vertically with respect to the bearing housing axis. Tubes 225 extend into holes 227 within outer bearing ring 207, thus ensuring twist-free positioning of outer bearing ring 207 within bearing housing 203.

In addition, two cutouts 228 which surround securing elements 225 are introduced within bearing housing 203. Cutouts 228 increase the free bending length in bearing housing 203, thus increasing the flexibility. As a result, the transmission of force to outer bearing ring 207 is less, which increases the secure bearing of outer bearing ring 207 or of bearing 205 itself within bearing housing 203, and reduces the excitation of vibrations of bearing housing 203.

Figure 12:
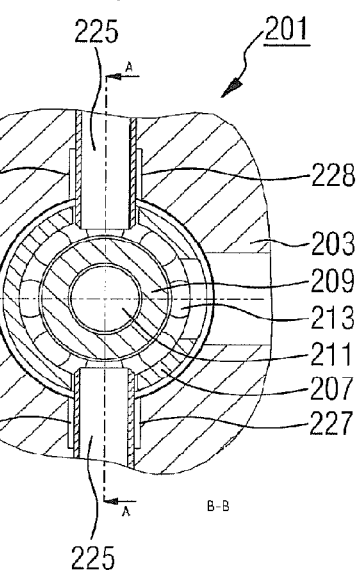
FIG. 12 shows the bearing unit according to FIG. 11 in a top view.

FIG. 12 shows bearing unit 201 according to FIG. 11 in a top view. Cutouts 228 for reducing the transmission of force are also clearly apparent here. As a whole, securing elements 225 allow outer bearing ring 207 sufficient room in the radial direction so that the outer bearing ring is able to utilize entire space 215 with respect to the bearing housing. The forces transmitted from securing elements 225 to outer bearing ring 207 are equal in magnitude and act in opposite directions, thus ensuring balancing of the forces.

FIG. 13 shows another bearing unit 241 for a turbocharger in a longitudinal section. Bearing unit 241 has an axially extending metallic bearing housing 243 and a bearing 245, designed as a double-row angular-contact ball bearing, positioned in this housing. Bearing 245 has an outer bearing ring 247 and a two-piece inner bearing ring 249 which is situated on a shaft 251. Spheres are inserted as rolling bodies 253.

For the further description of the individual bearing components of bearing unit 241, at this point reference is made to the detailed description for the preceding figures, which may be analogously transferred.

Securing elements 265 likewise designed as housing-mounted bolts are situated in bearing housing 243. In contrast to the above-described figures, however, securing elements 265 in FIG. 13 are designed as bolts having a rectangular cross section. The bolts likewise extend in holes 267 introduced into outer bearing ring 247. Holes 267 as well as securing elements 265 are provided opposite one another, so that the introduced forces are oppositely directed. Overall, twist-free positioning of outer bearing ring 247 in the bearing housing may thus also be assisted by this design.

FIG. 14 shows the bearing unit according to FIG. 13 in a top view. The rectangular cross section of securing elements 265 designed as bolts is clearly apparent. The oppositely situated arrangement of securing elements 265, which ensures the antitwist protection of outer bearing ring 247, is also apparent.

FIG. 15 shows another bearing unit 281 for a turbocharger in a longitudinal section, having an axially extending metallic bearing housing 283 and a bearing 285, designed as a double-row angular-contact ball bearing, positioned in the bearing housing. Bearing 285 has an outer bearing ring 287 and a two-piece inner bearing ring 289 which is situated on a shaft 291. Space 295 between bearing housing 283 and outer bearing ring 287 is acted on by oil, forming a vibration-damping quenching oil film 297.

The further description of the individual bearing components may be taken from the description for FIGS. 11 and 12 and from the other figures described above.

Securing elements 305, which are positioned opposite one another within bearing housing 283, are designed as housing-mounted bolts having a rectangular cross section. In addition, two cutouts 308 which surround securing elements 305 are introduced into bearing housing 283. Cutouts 308 reduce the transmission of force to outer bearing ring 287 and increase the free bending length in bearing housing 283, which increases the secure bearing of outer bearing ring 287 or of bearing 285 itself within bearing housing 283.

FIG. 16 shows the bearing unit according to FIG. 15 in a top view. The cutouts for reduced transmission of force between bearing housing 283 and outer bearing ring 287 are particularly clearly apparent with reference to this illustration. Due to the reduced transmission of force, in addition to the positioning of securing elements 305 it is ensured that quenching oil film 297 provided in space 295 between bearing housing 283 and outer bearing ring 287 is able to carry out its function as a vibration damper.

FIG. 17 shows another bearing unit 321 for a turbocharger in a longitudinal section, having a bearing 325 positioned in a bearing housing 323. Bearing 325 has an outer bearing ring 327 and a two-piece inner bearing ring 329. Spheres are inserted between bearing rings 327, 329 as rolling bodies 333. Quenching oil film 337 provided in space 335 between bearing housing 323 and outer bearing ring 327 is able to absorb the vibrations from shaft 331 which act on the bearing components during operation.

For the description of the individual bearing components of bearing unit 321, at this point reference is made to the detailed description for the preceding figures, which may be analogously transferred to FIG. 17.

A securing plate 345 is situated on the end-face side of bearing housing 323. Securing plate 345 is made of a metallic material, and is fixedly mounted on bearing housing 323. In addition, securing elements 347 designed as journals are provided on securing plate 345. Journals 347 are situated opposite one another on the securing plate, and thus represent the antitwist protection for outer bearing ring 327.

Outer bearing ring 327 and bearing housing 323 in each case provide a journal with a hole 349 formed from two recesses. Journals 347 impress supporting forces on outer bearing ring 327 in opposite directions, the supporting forces canceling each other out in sum, thus ensuring the function of quenching oil film 337 provided in space 335 as a vibration damper.

FIG. 18 shows another bearing unit 361 for a turbocharger in a longitudinal section, having a bearing housing 363 and a bearing 365. Bearing housing 363 of bearing unit 361 has two securing elements 385 designed as bolts. Securing elements 385 are situated opposite one another. Each securing element is held in a hole 387 between the inner side of bearing housing 363 and the outer periphery of outer bearing ring 367.

As previously explained for the preceding figures, bolts 385 impress supporting forces, which cancel each other out in sum, on outer bearing ring 367 in opposite directions. The function of quenching oil film 377 as a vibration damper is correspondingly maintained.

FIG. 19 shows the bearing unit according to FIG. 18 in a top view. The orientation and the oppositely situated arrangement of securing elements 385 in holes 387 are clearly apparent in this illustration. The forces transmitted from securing elements 385 to outer bearing ring 367 act in opposite directions. The forces mutually cancel each other out, thus allowing the twist-free positioning of outer bearing ring 367 within bearing housing 363.

LIST OF REFERENCE NUMERALS 1 bearing unit
3 bearing housing
5 bearing
7 outer bearing ring
9 inner bearing ring
11 shaft
13 rolling body
15 space
17 oil film
19 groove
21 groove
23 drainage groove
25 securing elements
27 holes
29 flattened area
31 flattened area
33 counter-flattened area
35 counter-flattened area
41 bearing unit
43 bearing housing
45 bearing
47 outer bearing ring
49 inner bearing ring
51 shaft
53 rolling body
55 space
57 oil film
59 groove
61 groove
63 drainage groove
65 securing elements
67 holes
69 flattened area
71 flattened area
73 counter-flattened area
75 counter-flattened area
81 bearing unit
83 bearing housing
85 bearing
87 outer bearing ring
89 inner bearing ring
91 shaft
93 rolling body
95 space
97 oil film
99 groove
101 groove
103 drainage groove
105 securing plate
107 securing element
109 groove
121 bearing unit
123 bearing housing
125 bearing
127 outer bearing ring
129 inner bearing ring
131 shaft
133 rolling body
135 space
137 oil film
139 groove
141 groove
143 drainage groove
145 securing plate
147 flattened area
149 counter-flattened area
161 bearing unit
163 bearing housing
165 bearing
167 outer bearing ring
169 inner bearing ring
171 shaft
173 rolling body
175 space
177 oil film
179 groove
181 groove
183 drainage groove
185 securing element
187 hole
201 bearing unit
203 bearing housing
205 bearing
207 outer bearing ring
209 inner bearing ring
211 shaft
213 rolling body
215 space
217 oil film
219 groove 221 groove
223 drainage groove
225 securing element
227 holes
228 cutouts
241 bearing unit
243 bearing housing
245 bearing
247 outer bearing ring
249 inner bearing ring
251 shaft
253 rolling body
255 space
257 oil film
259 groove
261 groove
263 drainage groove
265 securing element
267 hole
281 bearing unit
283 bearing housing
285 bearing
287 outer bearing ring
289 inner bearing ring
291 shaft
293 rolling body
295 space
297 oil film
299 groove
301 groove
303 drainage groove
305 securing element
307 hole
308 cutouts
321 bearing unit
323 bearing housing
325 bearing
327 outer bearing ring
329 inner bearing ring
331 shaft
333 rolling body
335 space
337 oil film
339 groove
341 groove
343 drainage groove
345 securing plate
347 securing element
349 hole
361 bearing unit
363 bearing housing
365 bearing
367 outer bearing ring
369 inner bearing ring
371 shaft
373 rolling body
375 space
377 oil film
379 groove
381 groove
383 drainage groove
385 securing element
387 hole

What is claimed is:

1. A bearing unit for a turbocharger comprising:
a bearing housing extending in an axial direction;
a bearing cartridge, situated within the bearing housing, having an outer bearing ring; and
a securing element, situated on the bearing housing, for the twist-free positioning of the outer bearing ring within the bearing housing,
a sum of forces acting on the outer bearing ring being zero.

2. The bearing unit as recited in claim 1 wherein an overall force acting on the outer bearing ring corresponds to the sum of the forces introduced by the securing element, a force of oil pressure, and a weight of the bearing cartridge.

3. The bearing unit as recited in claim 1 wherein the securing element is freely rotatable about its axis.

4. The bearing unit as recited in claim 1 wherein a plurality of securing elements is included, the securing elements being situated equidistantly along a periphery of the bearing housing.

5. The bearing unit as recited in claim 1 wherein the securing element is situated on an end-face side of the bearing housing.

6. The bearing unit as recited in claim 1 wherein a hole is provided for fastening the securing element.

7. The bearing unit as recited in claim 1 wherein the securing element is designed as a securing pin having a flattened area for contact with a counter-flattened area of the bearing cartridge.

8. The bearing unit as recited in claim 1 wherein the securing element is designed as a bolt fixedly situated in a shell of the bearing housing.

9. The bearing unit as recited in claim 1 further comprising a securing plate situated on an end-face side of the bearing housing.

10. The bearing unit as recited in claim 9 wherein the securing element is designed as a spring is situated on the securing plate.

* * * * *